United States Patent
Nystad et al.

(10) Patent No.: US 9,489,344 B2
(45) Date of Patent: Nov. 8, 2016

(54) METHODS OF AND APPARATUS FOR APPROXIMATING A FUNCTION

(71) Applicant: ARM Limited, Cambridge (GB)

(72) Inventors: Jorn Nystad, Trondheim (NO); Sean Tristram Ellis, Farnham (GB)

(73) Assignee: ARM LIMITED, Cambridge (GB)

( * ) Notice: Subject to any disclaimer, the term of this patent is extended or adjusted under 35 U.S.C. 154(b) by 211 days.

(21) Appl. No.: 13/929,599

(22) Filed: Jun. 27, 2013

(65) Prior Publication Data

US 2015/0002524 A1    Jan. 1, 2015

(51) Int. Cl.
*G06T 1/60* (2006.01)
*G06F 17/17* (2006.01)

(52) U.S. Cl.
CPC ............................ *G06F 17/17* (2013.01)

(58) Field of Classification Search
CPC ...................... G06T 1/60; G06F 17/17
See application file for complete search history.

(56) References Cited

U.S. PATENT DOCUMENTS

| | | | | |
|---|---|---|---|---|
| 6,253,311 | B1* | 6/2001 | Elliott et al. | 712/222 |
| 7,443,397 | B2* | 10/2008 | Chiang | 345/442 |
| 2002/0041761 | A1* | 4/2002 | Glotzbach et al. | 396/429 |

* cited by examiner

*Primary Examiner* — Xiao M. Wu
*Assistant Examiner* — Chong Wu
(74) *Attorney, Agent, or Firm* — Vierra Magen Marcus LLP

(57) ABSTRACT

A data processor of a processing system, such as a graphics processing system, converts an input data value into an output data value by approximating a function which maps input values to output values. The data processor approximates the function using first and second predetermined ranges of values which are quantized into plural corresponding pairs of range sections, a predetermined gradient for each pair of range sections, and predetermined section end values for each pair of range sections. By using these predetermined parameters, the approximation of the function can be implemented efficiently by the data processor of the processing system.

15 Claims, 4 Drawing Sheets

| u' | v' | Gradient after |
|---|---|---|
| 128 | 16 | 8 |
| 130 | 18 | 10 |
| 134 | 23 | 12 |
| 138 | 29 | 16 |
| 144 | 41 | 20 |
| 148 | 51 | 24 |
| 153 | 66 | 32 |
| 158 | 86 | 40 |
| 164 | 116 | 48 |
| 170 | 152 | 64 |
| 174 | 184 | 80 |
| 180 | 244 | 96 |
| 187 | 328 | 128 |
| 194 | 440 | 160 |
| 198 | 520 | 192 |
| 207 | 736 | 256 |
| 212 | 896 | 320 |
| 220 | 1216 | 384 |
| 228 | 1600 | 512 |
| 236 | 2112 | 640 |
| 240 | 2432 | 768 |
| 252 | 3584 | 1024 |

FIG 2

| u' | v' | | Gradient after |
|---|---|---|---|
| | exponent (n) | mantissa (m) | |
| 0 | 0 | 0 | 8 |
| 2 | 0 | 8 | 10 |
| 6 | 0 | 28 | 12 |
| 10 | 0 | 52 | 16 |
| 16 | 1 | 18 | 10 |
| 20 | 1 | 38 | 12 |
| 25 | 2 | 2 | 8 |
| 30 | 2 | 22 | 10 |
| 36 | 2 | 52 | 12 |
| 42 | 3 | 12 | 8 |
| 46 | 3 | 28 | 10 |
| 52 | 3 | 58 | 12 |
| 59 | 4 | 18 | 8 |
| 66 | 4 | 46 | 10 |
| 70 | 5 | 1 | 6 |
| 79 | 5 | 28 | 8 |
| 84 | 5 | 48 | 10 |
| 92 | 6 | 12 | 6 |
| 100 | 6 | 36 | 8 |
| 108 | 7 | 2 | 5 |
| 112 | 7 | 12 | 6 |
| 124 | 7 | 48 | 8 |

FIG 4

METHODS OF AND APPARATUS FOR APPROXIMATING A FUNCTION

BACKGROUND

The technology described herein relates to a method of and apparatus for approximating a function that maps input values to output values, particularly in the context of computer graphics processing.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

(In graphics literature, the term "rasterisation" is sometimes used to mean both primitive conversion to sample positions and rendering. However, herein "rasterisation" will be used to refer to converting primitive data to sampling point addresses only.)

The rasterising process determines the sample positions that should be used for a primitive (i.e. the (x, y) positions of the sampling points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sampling points (i.e. "shades" each sampling point). This can involve, as is known in the art, applying textures, blending sampling point data values, etc.

The data which is used to represent the primitive at the sampling point may have one or more functions applied to it, e.g. so as to apply gamma correction and/or to store the data in a different (e.g. more efficient) format. However, applying functions to inputted data can sometimes be computationally expensive, particularly where division is to be carried out in order to implement the function. For this reason, it is known to apply approximations of functions to inputted data which are computationally more efficient than applying the true functions. However, an approximation of a function can introduce errors between the data outputted using the approximated function and data which would have been outputted had the true function been applied. Furthermore, further errors can be introduced if the inverse of the approximation of the function is then later applied to the outputted data so as to recover the inputted data. These errors can be compounded if the approximation of the function and then its inverse are repeatedly applied to the data.

The Applicants, therefore, believe that there remains scope for improved techniques for approximating functions in, inter alia, the context of computer graphics processing.

BRIEF DESCRIPTION OF THE DRAWINGS

A number of embodiments of the technology described herein will now be described by way of example only and with reference to the accompanying drawings, in which:

FIG. 2 shows a look-up table according to one embodiment of the technology described herein;

FIG. 4 shows a look-up table according to another embodiment of the technology described herein.

Like reference numerals are used for like components where appropriate in the drawings.

DETAILED DESCRIPTION

Figure 1:
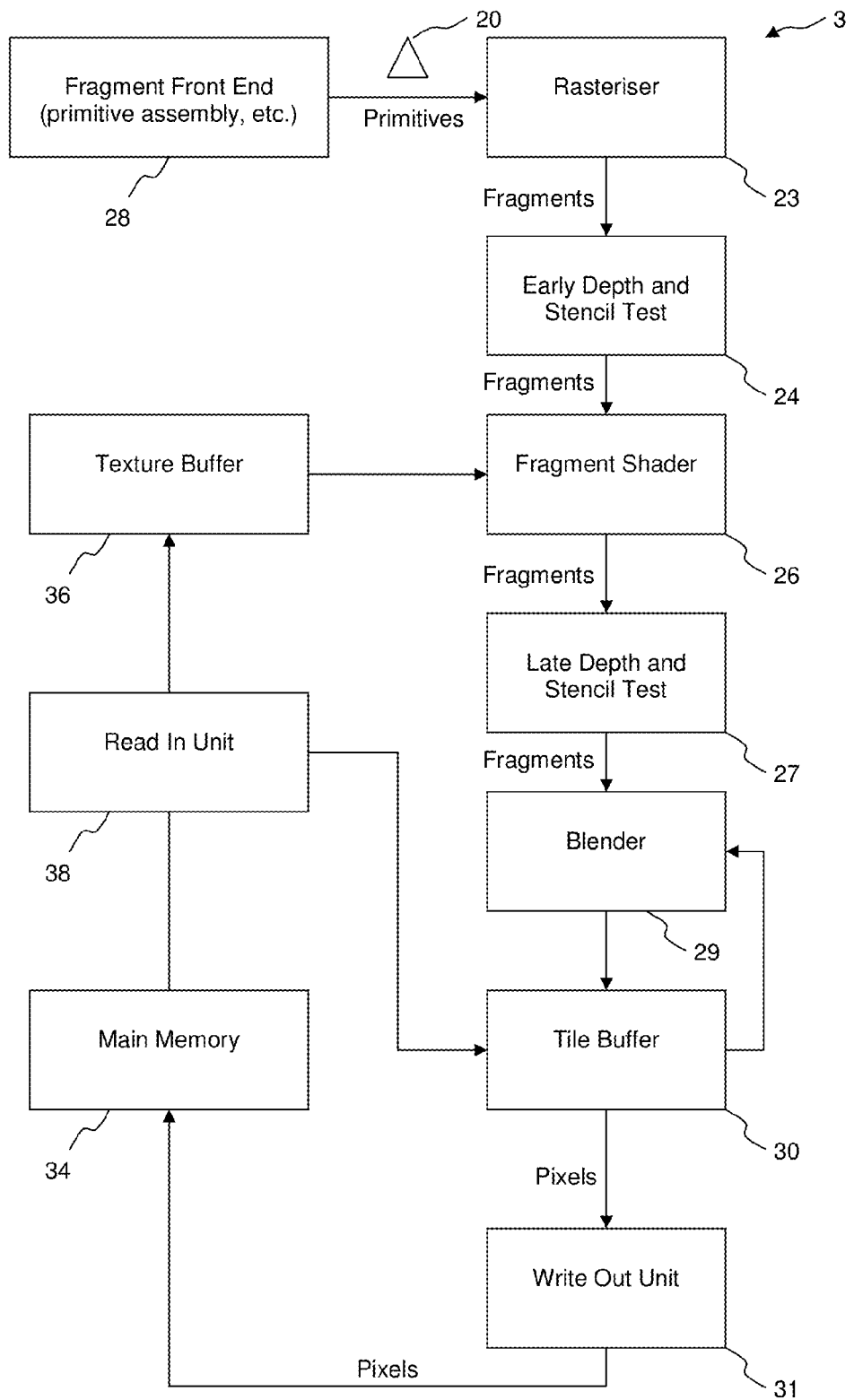
FIG. 1 shows schematically a graphics processing pipeline that can be operated in the manner of the technology described herein.

An embodiment of the technology described herein comprises a method of converting an input data value to an output data value by approximating a function that maps input values to output values, the method comprising:

deriving a first value from the input data value, wherein the first value is within a predetermined first range of values, the first range of values being quantised into a first set of plural range sections, wherein each range section of the first set of plural range sections comprises a first predetermined section end value;

converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the step of converting the first value into the second value comprises:

determining a first predetermined section end value for a first range section of the first set of plural range sections within which the first value lies, identifying a second predetermined section end value for a second range section of the second set of plural range sections that corresponds to the first range section, identifying the gradient associated with the pair of corresponding first and second range sections, and converting the first value into the second value using the first section end value, the second section end value and the gradient; and deriving the output data value from the second value.

Another embodiment of the technology described herein comprises a processing system comprising:

a data processor comprising processing circuitry, the processing circuitry being configured to perform a method of converting an input data value to an output data value by approximating a function that maps input values to output values, the method comprising:

deriving a first value from an input data value to be converted to an output data value, wherein the first value is within a predetermined first range of values, the first range of values being quantised into a first set of plural range sections, wherein each range section of the first set of plural range sections comprises a first predetermined section end value;

converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the step of converting the first value into the second value comprises:

determining a first predetermined section end value for a first range section of the first set of plural range sections within which the first value lies, identifying a second predetermined section end value for a second range section of the second set of plural range sections that corresponds to the first range section, identifying the gradient associated with the pair of corresponding first and second range sections, and converting the first value into the second value using the first section end value, the second section end value and the gradient; and deriving the output data value from the second value.

The technology described herein relates to approximating a function that maps input values to output values. In the technology described herein, the function is approximated using first and second predetermined ranges of values which are quantised into plural corresponding pairs of range sections, a predetermined gradient for each pair of range sections, and predetermined section end values for each pair of range sections. Thus, predetermined sets of values (e.g. section end values and gradients) are provided for approximating a function, and a computer such as a data processor can accordingly be optimised to apply the approximation of the function using the predetermined sets of values. The Applicants have therefore identified a way in which an approximation of a function can be optimized, e.g. in terms of computational efficiency and/or error, when approximating a function.

The method of the technology described herein may be performed as part of any suitable computer implemented process in which a function is to be approximated. However, in an embodiment, the method of the technology described herein is performed as part of a graphics processing operation and/or is performed by a (e.g. tile-based) graphics processing system.

Accordingly, the input data value and/or output data value may be generated as a result of, and/or may later be used in, a graphics processing operation (e.g. a rendering or shading operation) and/or may be generated by, and/or later used by, a (e.g. tile-based) graphics processing system. In particular, the input data value and/or output data value in an embodiment represents a colour value generated by, and/or later to be used in, a graphics processing operation (e.g. a rendering or shading operation) and/or represents a colour value generated by, and/or later used by, a (e.g. tile-based) graphics processing system. The data processor referred to above may therefore operate as a read in unit or write out unit of a (e.g. tile based) graphics processing system, and the input data value and/or output data value may be stored in a buffer (such as a tile buffer or a texture buffer) or external memory of or for the (e.g. tile based) graphics processing system.

Thus, another embodiment of the technology described herein comprises a method of operating a graphics processing system that comprises:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store rendered fragment data locally to the graphics processing pipeline prior to that data being written out to an external memory, the buffer comprising an allocated amount of memory for use as the buffer; and a write out stage configured to write data stored in the buffer to an external memory;

the method comprising the write out stage, when writing data from the buffer to the external memory, converting input data values stored in the buffer into output data values to be stored in the external memory by approximating a function that maps input values to output values, the method of converting the input data values to the output data values comprising for each input data value in the buffer to be converted to an output data value:

deriving a first value from the input data value in the buffer, wherein the first value is within a predetermined first range of values, the first range of values being quantised into a first set of plural range sections, wherein each range section of the first set of plural range sections comprises a first predetermined section end value;

converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the step of converting the first value into the second value comprises:

determining a first predetermined section end value for a first range section of the first set of plural range sections within which the first value lies, identifying a second predetermined section end value for a second range section of the second set of plural range sections that corresponds to the first range section, identifying the gradient associated with the pair of corresponding first and second range sections, and converting the first value into the second value using the first section end value, the second section end value and the gradient; and deriving the output data value from the second value; and writing the output data value to the external memory.

Another embodiment of the technology described herein comprises a graphics processing system comprising:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store rendered fragment data locally to the graphics processing pipeline prior to that data being written out to an external memory, the buffer comprising an allocated amount of memory for use as the buffer;

a write out stage configured to write data stored in the buffer to an external memory;

wherein the write out stage is configured to, when writing data from the buffer to the external memory, convert input data values stored in the buffer into output data values to be stored in the external memory by approximating a function that maps input values to output values, the converting the input data values to the output data values comprising for each input value data in the buffer to be converted to an output data value:

deriving a first value from the input data value in the buffer, wherein the first value is within a predetermined first range of values, the first range of values being quantised into a first set of plural range sections, wherein each range section of the first set of plural range sections comprises a first predetermined section end value;

converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the step of converting the first value into the second value comprises:

determining a first predetermined section end value for a first range section of the first set of plural range sections within which the first value lies, identifying a second predetermined section end value for a second range section of the second set of plural range sections that corresponds to the first range section, identifying the gradient associated with the pair of corresponding first and second range sections, and converting the first value into the second value using the first section end value, the second section end value and the gradient; and deriving the output data value from the second value; and writing the output data value to the external memory.

In an embodiment, the graphics processing system is a tile-based graphics processing system and/or the buffer is a tile buffer.

Another embodiment of the technology described herein comprises a method of operating a graphics processing system that comprises:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline prior to that data being used by the graphics processing pipeline; and a read in stage configured to read data into the buffer from an external memory;

the method comprising the read in stage, when reading data from the external memory to the buffer, converting input data values stored in the external memory into output data values to be stored in the buffer by approximating a function that maps input values to output values, the method of converting the input data values to the output data values comprising for each input data value in the external memory to be converted to an output data value:

deriving a first value from the input data value in the external memory, wherein the first value is within a predetermined first range of values, the first range of values being quantised into a first set of plural range sections, wherein each range section of the first set of plural range sections comprises a first predetermined section end value;

converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the step of converting the first value into the second value comprises:

determining a first predetermined section end value for a first range section of the first set of plural range sections within which the first value lies, identifying a second predetermined section end value for a second range section of the second set of plural range sections that corresponds to the first range section, identifying the gradient associated with the pair of corresponding first and second range sections, and converting the first value into the second value using the first section end value, the second section end value and the gradient; and deriving the output data value from the second value; and writing the output data value to the buffer.

Another embodiment of the technology described herein comprises a graphics processing system comprising:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline prior to that data being used by the graphics processing pipeline; and a read in stage configured to read data into the buffer from an external memory;

wherein the read in stage is configured to, when reading data from the external memory to the buffer, convert input data values stored in the external memory into output data values to be stored in the buffer by approximating a function that maps input values to output values, the method of converting the input data values to the output data values comprising for each input data value in the external memory to be converted to an output data value:

deriving a first value from the input data value in the external memory, wherein the first value is within a predetermined first range of values, the first range of values being quantised into a first set of plural range sections, wherein each range section of the first set of plural range sections comprises a first predetermined section end value;

converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the step of converting the first value into the second value comprises:

determining a first predetermined section end value for a first range section of the first set of plural range sections within which the first value lies, identifying a second predetermined section end value for a second range section of the second set of plural range sections that corresponds to the first range section, identifying the gradient associated with the pair of corresponding first and second range sections, and converting the first value into the second value using the first section end value, the second section end value and the gradient; and deriving the output data value from the second value; and writing the output data value to the buffer.

In an embodiment, the graphics processing system is a tile-based graphics processing system and/or the buffer is a texture buffer.

The technology described herein can be used for any suitable and desired form of data, e.g. input data values and output data values. In an embodiment it is used for converting data values in a floating point format into data values a non-floating point format (or vice-versa). In this case the input data values will be in floating point format, and the output data values will be in an alternative format (or vice-versa). This may be particularly useful for graphics data that is typically processed in floating point format, such as high dynamic range colour data, but which it may be desired to process or store in non-floating point format.

The floating point format may be binary16, binary32, binary64, etc. As is known in the art, for example, the binary16 format comprises 1 sign bit, 5 exponent bits, and 10 mantissa bits, with the mantissa having an implicit leading 1. The base for the exponent in binary16 format is 2, and the exponent value is offset by 15.

In the technology described herein, the function that is being approximated maps input values to output values. The input values and/or output values that are mapped using the function may be the input data values and/or output data values referred to above, which are in an embodiment stored in a buffer and/or in external memory. However, in an embodiment, the input values and/or output values are intermediate input values and/or intermediate output values derived or derivable from the, e.g. stored, input data values and/or output data values.

Whatever the original format of the input data values, in embodiments, the section end values for the first range sections in which the first value may lie are each represented by one or more integers. The section end values are in an embodiment represented by a given (and in an embodiment the same) number of bits for each section end value.

Similarly, in embodiments, the section end values for the corresponding second range sections are each represented by one or more integers. Again, the section end values are in an embodiment represented by a given (and in an embodiment the same) number of bits for each section end value.

Constraining the section end values to be integers (e.g. having a limited number of bits) in this way reduces the number of bits needed to process (e.g. store, perform interpolations using, etc.) the section end values.

Similarly, in embodiments, the corresponding gradients for pairs of first and second range sections are each represented by one or more integers. The gradients are again in an embodiment represented by a given (and in an embodiment the same) number of bits for each gradient. Again, constraining the gradients to be integers (e.g. having a limited number of bits) reduces the number of bits needed to process (e.g. store, perform interpolations using, etc.) the gradients.

In an embodiment, the gradient values are all take from (are constrained to be from) a predetermined set of permitted or allowed gradient values. In an embodiment, the gradients are selected from the set $\{3, 4, 5\}*2^n$, where n is a positive integer. These embodiments are particularly advantageous in that division by 2, 3 and 5 and their multiples can be made relatively computationally less expensive, for example, using a bit shift for division by 2 and dedicated divide by 3 and divide by 5 circuits.

In an embodiment, each input value is in a first range, in an embodiment 1.0-256.0. Thus, in embodiments in which the input value is the input data value, each input data value is in an embodiment in the range 1.0-256.0. Similarly, in embodiments in which the input value is an intermediate input value that is derived or derivable from the input data value, the intermediate input value is in an embodiment in the range 1.0-256.0.

In an embodiment, as discussed above, the input data value is in floating point format. In these embodiments, the input value is in an embodiment an intermediate input value derived or derivable from the input data value. In these embodiments, one way to derive the intermediate input value is to consider certain bits of the floating point representation and/or ignore certain other bits of the floating point representation. For example, the intermediate input value may be derived by considering a number of the least significant bits of the exponent (e.g. the 3 least significant bits of the exponent) of the floating point representation and/or ignoring a number of the most significant bits of the exponent (e.g. the 2 most significant bits of the exponent (where the data input value is in binary16 format)) of the floating point representation. As will be appreciated, considering only the 3 least significant bits of the exponent means that there are only 8 (i.e. $2^3$) possible different values for the exponent. Where the base for the exponent is 2 and there is a implicit leading 1 for the mantissa, this means that the range of intermediate input values derivable from the input data values is limited to the range 1 to 256 (i.e. $1 \times 2^0$ to $1 \times 2^8$).

The first value may be derived from the input data value as desired. In some embodiments, the first value is the input data value. In these embodiments, deriving the first value from the input data value simply comprises reading the input value for use as the first value. However, in embodiments, the input data value is processed so as to derive the first value. In some embodiments, this may be achieved by first deriving the intermediate input value from the input data value, and then deriving the first value from the intermediate input value. In other embodiments, this may be achieved by deriving the first value without deriving the intermediate input value and/or directly from the input data value.

In embodiments, the input value (i.e. either the data input value or intermediate input value) is processed so as to derive the first value by offsetting and/or scaling the input value to give the first value.

As discussed above, in an embodiment, the input value is in a first range, in an embodiment 1.0-256.0. In an embodiment, the first value is in a second range (different to the first range), in an embodiment 16-4096. In an embodiment, the input value (v) may be scaled by 16 to give a first value (v'), in an embodiment such that:

$$v'=v \times 16$$

In these embodiments, the section end values for the first range sections in which the first value (v') may lie are then integers represented by 12 bits.

In embodiments in which the input values are intermediate input values that are derived or derivable from a floating point format, the floating point representation may be processed so as to (e.g. directly) derive the first value by reading particular bits of the floating point representation (e.g. so as to implicitly cause an offset and/or scaling). In these embodiments, the intermediate input value may not actually be derived from the floating point format, although the intermediate input values are in an embodiment still derivable from a floating point format.

In an embodiment, a selected number (e.g. some (but not all)) of the bits of the floating point representation are read and used to derive the first value. These embodiments are particularly advantageous in that the first value can be (e.g. directly) derived by reading (some or all of) the bits of the floating point format.

In an embodiment, a selected number of the least significant bits of the exponent of the floating point representation (e.g. the least significant 3 bits of the exponent) and a selected number of the most significant bits of the mantissa of the floating point representation (e.g. the most significant 6 bits of the mantissa) are read and used to derive the first value.

In these embodiments, the first value may comprise an exponent part (n) and a mantissa part (m), in an embodiment such that the intermediate input value v would be given by:

$$v=[1+m/64]2^n$$

Where the 3 least significant bits of the exponent of the floating point representation are used, the exponent part of the first value is in an embodiment in the range 0-7. Where the 6 most significant bits of the mantissa of the floating point representation are used the mantissa part of the first value is in an embodiment in the range 0-63.

Similarly, in an embodiment, the section end values for the first range sections in which the first value (v') may lie are represented by an exponent (n) and mantissa (m), in an embodiment such that:

$$v=[1+m/64]2^n$$

In these embodiments, the section end values for the first range sections in which the first value (v') may lie are in an embodiment represented by two integers, one integer (e.g. of 3 bits) to represent the exponent (n) and one integer (e.g. of 6 bits) to represent the mantissa (m) (i.e. 9 bits in total in this example). This allows relatively fewer bits to be used to process (e.g. store, perform interpolations using, etc.) the section end values for the first range sections.

In an embodiment in which the section end values for the first range sections are represented by an exponent and mantissa, the gradients are (only) selected from a predetermined set of gradients, in an embodiment the set {5, 6, 8, 10, 12, 16}, and (the same) gradient values are reused for different exponent values. Thus, in an embodiment, the gradient of a function over a large dynamic range can be represented by an integer that is represented by 3 bits. Thus, fewer bits are required to process (e.g. store, perform interpolations using, etc.) the gradients in these embodiments when compared to embodiments in which gradients are not reused for different exponents.

The output data value, intermediate output value, and/or second value may similarly have any desired and suitable format.

In some embodiments, the output data value is the second value. In these embodiments, deriving the output data value from the second value comprises reading the second value for use as the output data value. However, in embodiments, the second value is processed so as to derive the output data value. In some embodiments, this may be achieved by first deriving the intermediate output value from the second value, and then deriving the output data value from the intermediate output value. In other embodiments, this may be achieved by deriving the output data value without deriving the intermediate output value and/or directly from the second value.

In embodiments, the second value is processed so as to derive the output value (i.e. either the intermediate output value or output data value) by offsetting and/or scaling the second value to give the output value.

In an embodiment, the second value is in a third range, in an embodiment 128-256, and the output value is in a fourth range (different to the third range), in an embodiment 1.0-2.0. Thus, in embodiments in which the output value is the output data value, each output data value is in an embodiment in the range 1.0-2.0. Similarly, in embodiments in which the output value is an intermediate output value that is derivable from the output data value, the intermediate output value is in an embodiment in the range 1.0-2.0.

In an embodiment, the second value (u') may be scaled by 128 to give the output value (u), in an embodiment such that:

$$u=u'/128$$

In these embodiments, the section end values for the second range sections are then integers represented by 8 bits.

In another embodiment, the second value is in the range 0-128 and the output value is in the range 1.0-2.0. In this embodiment, the second value (u') may be scaled by 128 and offset by 1 to give the output value (u) using the equation:

$$u=(u'/128)+1$$

In some of these embodiments, the section end values for the second range sections are then integers represented by 7 bits. Thus, fewer bits are required to process (e.g. store, perform interpolations using, etc.) the section end values for the second range sections in this embodiment when compared to the embodiment in which no offsetting occurs.

As discussed above, in an embodiment, the output data value is in the range 1.0-2.0. This output data value is in an embodiment stored, e.g. in external memory, in a storage format. The storage format can take any desired and suitable form. However, in an embodiment, the storage format is considered to have an implied 1 and so only the fraction part of the output data value is stored. In an embodiment, 13 bits of the fraction part (e.g. the 13 most significant bits of the fraction part) are stored.

In an embodiment, the storage format has one or more sign bits (e.g. the sign bit of the floating point representation of the input data value), one or more scale bits (e.g. the 2 most significant bits of the exponent of the floating point representation of the input data value (in an embodiment the bits which were not considered when deriving the first value)), and one or more fraction bits (e.g. 13 bits of the fraction part of the output data value). The sign bits and scale bits can be copied across from the floating point representation of the input data value to the output data value format.

In some embodiments, and depending on the particular function being approximated, the input data value, intermediate input value, first value, first range of values, section end values for the first range sections, etc. correspondingly and/or respectively have the properties described herein of the output data value, intermediate output value, second value, second range of values, section end values for the second range sections, etc. (and vice versa).

In an embodiment, the sections within the first and/or second set of plural range sections are contiguous. In other words, the upper section end value of a given range section is the same as the lower section end value of the next higher range section, and so on. Similarly, the lower section end value of a given range section is the same as the upper section end value of next lower range section, and so on. This can allow, for example, for the function to be suitably approximated for all values across a given range of input values and their corresponding output values.

The first predetermined section end value which is determined for the first range section of the first set of plural range sections within which the first value lies can be determined in any desired and suitable way.

However, in an embodiment, the first predetermined section end value is determined by comparison of the first value with one or more first predetermined section end values of a set of first predetermined section end values which respectively correspond to each of the sections of the first set of plural range sections. In an embodiment, the set of first predetermined section end values are stored in a look-up table. The look-up table may be stored in memory and/or may be accessed using a set of logical operations and/or nested set of comparators.

The look-up table in an embodiment associates each first predetermined section end value of the set of first predetermined section end values with corresponding second predetermined section end values of a set of second predetermined section end values, with each second predetermined section end values corresponding respectively to the sections of the second set of plural range sections. In these embodiments, identifying a second predetermined section end value for the second range section that corresponds to the first range section in an embodiment comprises using the look-up table.

The look-up table in an embodiment also associates each first predetermined section end value of the set of first predetermined section end values and/or each second predetermined section end value of the set of second predetermined section end values with a corresponding gradient. In these embodiments, identifying the gradient associated with the pair of corresponding first and second range sections in an embodiment comprises using the look-up table.

In embodiments in which the first section end values are (each) represented by a mantissa and an exponent, both the mantissa and the exponent may be stored in the look-up table and may be used to look-up the corresponding second section end value and/or gradient. This allows the same exponent but different mantissas to be used to look up different second section end value and/or gradients, and/or allows the same mantissa but different exponents to be used to look up different second section end value and/or gradients. This can, for example, allow reuse of section end values and/or gradients and/or reduce the range of section end values and/or gradients that need to be stored, thereby reducing the number of bits needed to store section end values and/or gradients.

In the technology described herein, once the first and second predetermined end values and the gradient have been identified, they are then used to generate the second value. This can be done in any desired and suitable way.

In some embodiments, the gradient is defined as being the change in output value for a given change in input value (output/input gradient). In other embodiments, the gradient may be defined as being the change in input value for a given change in output value (input/output gradient).

Where the gradient is defined as the change in output value for a given change in input value (i.e. is an output/input gradient), the second value may be generated by a calculation involving taking the difference between a value based on first value and a value based on first section end value, multiplying by a value based on the gradient, and adding to (if lower section end values are used) or subtracting from (if upper section end values are used) a value based on the second section end value.

Where the first value is a scaled version of the input value and/or the output value is a scaled version of the second value, then the calculation may involve suitable multiplications and/or divisions to take account of the scaling.

For example, where the input value (u) is scaled by 128 to give the first value (u') and the second value (v') is scaled by 16 to give the output value (v), the second value (v') may be generated as follows:

$$v'=\{[(u'-\text{second section end value})*\text{gradient}*16]/128\}+\text{first section end value}$$

Similarly, where the input value (u) is scaled by 128 to give the first value (u') and the second value (v') is scaled by 64 to give the output value (v), the second value (v') may be generated as follows:

$$v'=\{[(u'-\text{second section end value})*\text{gradient}*64]/128\}+\text{first section end value}$$

In embodiments in which the first value, second value, and/or a section end value is represented by a mantissa and an exponent, the parameters used in the above equations may be the corresponding mantissas for those values.

Where the gradient is defined as the change in input value for a given change in output value (input/output gradient), the second value may be generated by a calculation involving taking the difference between a value based on first value and a value based on first section end value, dividing by a value based on the gradient, and adding to (if lower section end values are used) or subtracting from (if upper section end values are used) a value based on the second section end value.

Where the first value is a scaled version of the input value and/or the output value is a scaled version of the second value, then the calculation may involve suitable multiplications and/or divisions to take account of the scaling.

For example, where the input value (v) is scaled by 16 to give the first value (v') and the second value (u') is scaled by 128 to give the output value (u), the second value (u') may be generated as follows:

$$u'=\{[(v'-\text{first section end value})*128]/[\text{gradient}*16]\}+\text{second section end value}$$

Similarly, where the input value (v) is scaled by 64 to give the first value (v') and the second value (u') is scaled by 128 to give the output value (u), the second value (u') may be generated as follows:

$$u'=\{[(v'-\text{first section end value})*128]/[\text{gradient}*64]\}+\text{second section end value}$$

In embodiments in which the first value, second value, and/or a section end value is represented by a mantissa and an exponent, the parameters used in the above equations may be the corresponding mantissas for those values.

Although the technology described herein has been described above primarily with reference to the processing of a particular input data value, as will be appreciated by those skilled in the art, this operation is in an embodiment performed for and in respect of plural input data values (and in an embodiment each input data value) to which the conversion is to be applied.

The function that is being approximated in the technology described herein can be any desired and suitable function. In some embodiments, the function is used to apply or remove gamma correction from a set of input (colour) values and/or to change (increase or decrease) the dynamic range of a set of input (colour) values.

In embodiments, the function which is being approximated is a storage function S(v). In other embodiments, the function which is being approximated is a retrieval function R(u). The retrieval function R(u) is in an embodiment the inverse of the storage function S(v), such that S(v)=u and R(u)=v.

In embodiments, the function is monotonic. In other words, for each input value, the function generates a unique output value. This can ensure, for example, that the function can be suitably inverted and applied to the output value so as to recover a value which is identical or similar to the input value.

In embodiments, the function is a power law function, for example having the form $R(u)=ku^p$, where p and k are constants. In an embodiment, the function is given by $R(u)=u^8$. In embodiments, the power law function is used as a retrieval function.

In other embodiments, the function is an inverse power law function, for example having the form $S(v)=1/k \times v^{1/p}$, where p and k are constants. In an embodiment, the function is given by $S(v)=v^{1/8}$. In embodiments, the inverse power law function is used as a storage function.

In some embodiments, the method of the technology described herein is applied so as to approximate the storage function to store an "output data value" and then is later suitably modified (inverted) and applied so as to approximate the retrieval function, with the stored output data value being used as an "input data value" in the method. This may done, for example, when writing colour values from a (e.g. tile) buffer to an external memory and then later reading those same colour values back into the graphics processing pipeline for further processing.

In these embodiments, the processes used when approximating the storage function to: i) derive the output data value from the second value, ii) convert the first value into the second value, and iii) derive the first value from the input data value, are inverted and are used to approximate the retrieval function.

The process of approximating the storage function and then the retrieval function may be repeated plural times, each time suitably modifying (inverting) and applying the method of the technology described herein, with the output data value being used as an "input data value" in the method.

Similarly, in some embodiments, the method of the technology described herein is also or instead applied so as to approximate the retrieval function to read out an "output data value" and then is later suitably modified (inverted) and applied so as to approximate the storage function, with the output data value being used as an "input data value" in the method. This may done, for example, when reading colour values into the graphics processing pipeline for processing and then later writing those same colour values from a (e.g. tile) buffer to an external memory (e.g. when the colour values remain unchanged by the graphics processing operation).

In these embodiments, the processes used when approximating the retrieval function to: i) derive the output data value from the second value, ii) convert the first value into the second value, and iii) derive the first value from the input data value, are inverted and are used to approximate the storage function.

The process of approximating the retrieval function and then the storage function may be repeated plural times, each time suitably modifying (inverting) and applying the method of the technology described herein, with the output data value being used as an "input data value" in the method.

The technology described herein can be used for all forms of input and output that a graphics processing pipeline may be used to process and/or generate, such as frames for display, render-to-texture outputs, etc.

In some embodiments, the graphics processing pipeline comprises, and/or is in communication with, one or more memories and/or memory devices that store the data described herein, such as the input data values, output data values, predetermined sets of values etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry, and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, if desired.

The technology described herein is applicable to any form or configuration of graphics processing pipeline and to all forms of rendering, such as immediate mode rendering, deferred mode rendering, tile-based rendering, etc. It is particularly applicable to graphics renderers that use deferred mode rendering and in particular to tile-based renderers.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. Thus, embodiments of the technology described herein comprise computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics.

FIG. 1 shows a graphics processor 3 according to one embodiment of the technology described herein. The graphics processor 3 shown in FIG. 1 is a tile-based graphics processing pipeline and will thus, as is known in the art, produce tiles of a render output data array, such as an output frame to be generated.

As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may, as is known in the art, typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 20 for input to the rasterisation process have been generated. Thus, at this point the graphics data (the vertex data) has undergone fragment frontend operations 28, such as transformation and lighting operations (not shown), and a primitive set-up stage (not shown) to set-up the primitives to be rendered, in response to the commands and vertex data provided to the graphics processor, as is known in the art.

As shown in FIG. 1, this part of the graphics processing pipeline 3 includes a number of stages, including a rasterisation stage 23, an early Z (depth) and stencil test stage 24, a fragment shading stage 26, a late Z (depth) and stencil test stage 27, a blending stage 29, a tile buffer 30 and a downsampling and write out (multisample resolve) stage 31.

The rasterisation stage 23 of the graphics processing pipeline 3 operates, as is known in the art, to rasterise the primitives making up the render output (e.g. the image to be displayed) into individual graphics fragments for processing. To do this, the rasteriser 23 receives graphics primitives 20 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 24 performs, is known in the art, a Z (depth) test on fragments it receives from the rasteriser 23, to see if any fragments can be discarded (culled) at this stage. To do this, it compares the depth values of (associated with) fragments issuing from the rasteriser 23 with the depth values of fragments that have already been rendered (these depth values are stored in a depth (Z) buffer that is stored in the tile buffer 30) to determine whether the new fragments will be occluded by fragments that have already been rendered (or not). At the same time, an early stencil test is carried out.

Fragments that pass the fragment early Z and stencil test stage 24 are then sent to the fragment shading stage 26. The fragment shading stage 26 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. The textures may be stored in external memory 34, and may be read from the external memory 34 into a texture buffer 36 that is accessible to the fragment shader 26. In the present embodiment, the fragment shading stage 26 is in the form of a shader pipeline (a programmable fragment shader), but other arrangements, such as the use also or instead of fixed function fragment shading units would be possible, if desired.

There is then a "late" fragment Z and stencil test stage 27, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 26 with the depth values of fragments that have already been rendered (as stored in the depth buffer). This late fragment depth and stencil test stage 27 also carries out any necessary "late" alpha and/or stencil tests on the fragments.

The fragments that pass the late fragment test stage 27 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to a colour buffer in the tile buffer 30 from where they can, for example, be output to a frame buffer for display. The depth value for an output fragment is also written appropriately to a Z-buffer within the tile buffer 30. (The colour buffer and Z-buffer will store, as is known in the art, an appropriate colour, etc., or Z-value, respectively, for each sampling point that the buffers represent (in essence for each sampling point of a tile that is being processed).) The colour buffer and Z-buffer store, as is known in the art, an array of fragment data that represents part of the render output (e.g. image to be displayed).

In the present embodiment, the tile buffer 30 comprises an allocated portion of RAM that is located on (local to) the graphics processing pipeline (on-chip).

The, e.g. colour, data from the tile buffer 30 is input to a write out unit 31, and thence output (written back) to an output buffer, such as a frame buffer of a display device (not shown). (The display device could comprise, e.g., a display comprising an array of pixels, such as a computer monitor or a printer.)

Once a tile of the render output has been processed and its data exported to external memory (e.g. to a frame buffer (not shown) in the main memory 34) for storage, the next tile is then processed, and so on, until sufficient tiles have been processed to generate the entire render output (e.g. frame (image) to be displayed).

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

An embodiment of the technology described herein, in which the colour data which is stored in the tile buffer 30 is stored in floating point format is written out to main memory 34 using the process of the technology described herein will be described as an example of the operation of the graphics processing pipeline in the manner of the technology described herein.

In this embodiment, the colour data is stored as input data values in binary16 format. As is known in the art, binary16 format has 1 sign 1, 5 exponent bits, and 10 mantissa bits. Thus, the binary16 format is:

TABLE 1

| Sign | Exponent | | | | | Mantissa | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |

The exponent is offset by 15, and the base for the exponent is 2. Thus, the position of the floating point is determined by subtracting 15 from the exponent. The mantissa has an implicit leading 1.

In this embodiment, when the colour data which is stored in the tile buffer 30 is exported to main memory 34 by the write out unit 31, each input data value is used to derive an input value v. In this embodiment, input values are derived from the floating point representations of the input data value by considering only the 3 least significant bits of the exponent (i.e. bits 10-12). Thus, the range of input values is given by $1.0 \leq v < 256.0$.

An approximation of a storage function $S(v)$ is then applied to the input value by the write out unit 31 to give an output value u. The storage function which is approximated in this embodiment is the monotonic power-law function:

$$S(v) = v^{1/8} = u$$

Since the range of input values is given by $1.0 \leq v < 256.0$, the range of output values is given by $1.0 \leq u < 2.0$.

The output value u is then stored as an output data value in main memory 34. In this embodiment, the storage format for the output data value comprises the sign bit of the floating point representation (i.e. bit 15) of the input data value, 2 scale bits which correspond to the 2 most significant bits of the exponent (i.e. bits 13-14) of the input data value, and 13 fraction bits from the output value of u (i.e. it is implicit that u is in the range 1 to 2, and so only bits which represent the fraction are stored). Thus, the storage format is:

| Sign | Scale | | Fraction | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |

In one embodiment, the approximation of the storage function makes use of the look-up table shown in FIG. 2. This look-up table is derived in the following way.

Firstly, the input values and output values are mapped into predetermined ranges. In this embodiment, each input value v is mapped to a first predetermined range of values v' by scaling the input value v by 16 using the following equation:

$$v' = v \times 16$$

Since the range of input values in this embodiment is given by $1.0 \leq v < 256.0$, the first predetermined range in this embodiment is $16.0 \leq v' < 4096$.

Similarly, each output value u is mapped to a second predetermined range of values u' by scaling the output value u by 128 using the following equation:

$$u' = u \times 128$$

Since the range of output values in this embodiment is given by $1.0 \leq u < 2.0$, the second predetermined range in this embodiment is $128.0 \leq u' < 256$.

In this embodiment, the first and second predetermined ranges are then respectively quantised into contiguous range sections. For example, the first predetermined range is quantised into a set of first range sections {16-18, 18-23, 23-29 . . . . . . 2112-2432, 2432-3584 and 3584-4096} as indicated by column 2 of the table shown in FIG. 2, and the second predetermined range is quantised into a set of second range sections {128-130, 130-134, 134-138 . . . . . . 236-240, 240-252 and 252-256} as indicated by column 1 of the table shown in FIG. 2.

It should be noted that the end values for the range sections are integers. Constraining the section end values in this way reduces the number of bits needed to represent and store the section end values in the look-up table and can increase the computational efficiency of calculations made using those values.

Each first range section in the set of first range sections corresponds to a second range section in the set of second range sections such that there are pairs of corresponding first and second range sections for approximating the function. In this embodiment, as indicated by the table, the range section 16-18 of the set of first range sections corresponds to the range section 128-130 of the set of second range sections, the range section 18-23 of the set of first range sections corresponds to the range section 130-134 of the set of second range sections, and so on.

Each pair of first and second corresponding range sections is also associated with a gradient. The gradient for each pair of first and second corresponding range sections approximates the gradient of the storage function for that pair of corresponding first and second range sections. In this embodiment, as indicated by the table, the set of gradients are {8, 10, 12 . . . . . . 640, 768, 1024}, with the gradient 8 being associated with the pair of corresponding ranges 16-18 and 128-130, the gradient 10 being associated with the pair of corresponding ranges 18-23 and 130-134, and so on.

It will be noted that the gradients for the pairs of first and second corresponding range sections are also integers. As mentioned above, constraining the gradients in this way reduces the number of bits needed to represent and store the gradients in the look-up table and can increase the computational efficiency of calculations made using those gradients. It will also be noted that the gradients for the pairs of first and second corresponding range sections are selected from the set {3, 4, 5}2n, where n is a positive integer. Further constraining the gradients in this way allows divisions using the gradients to be implemented efficiently using bit shifts (for division by 2) and two dedicated division circuits (for division by 3 and 5).

Use of the table in FIG. 2 to approximate the storage function will now be described.

An input data value in floating point format in the tile buffer 30 is read into the write out unit 31. For example, the floating point representation for the decimal number 4.25 is:

| Sign | Exponent | | | | | | | Mantissa | | | | | | | |
|---|---|---|---|---|---|---|---|---|---|---|---|---|---|---|---|
| 0 | 1 | 0 | 0 | 0 | 1 | 0 | 0 | 0 | 1 | 0 | 0 | 0 | 0 | 0 | 0 |

The write out unit 31 derives an input value v from the floating point representation of the input data value. If the decimal value derivable from the floating point representation is inside the range 1 to 256, the input value is the decimal value derivable from the floating point representation of the input data value. However, if the decimal value derivable from the floating point representation of the input data value is outside the range 1 to 256, then the input data value is scaled by $256^s$ to give an intermediate input value, where s in a positive integer. A simple way to implement this scaling is by only considering the lowest 3 bits of the exponent of the input data value. For example, the floating point representation for the decimal number 1088 may be scaled by $256^1$, to give an intermediate input value v of 4.25. However, the floating point representation for the decimal number 1088 is:

| Sign | Exponent | | | | | | | Mantissa | | | | | | | |
|---|---|---|---|---|---|---|---|---|---|---|---|---|---|---|---|
| 0 | 1 | 1 | 0 | 0 | 1 | 0 | 0 | 0 | 1 | 0 | 0 | 0 | 0 | 0 | 0 |

Since the representations for 4.25 and 1088 have the same mantissa and the same lowest 3 bits of exponent, 1088 can be processed to produce the output data value in the same way as 4.25 without any need to carry out any explicit scaling. Thus, the input value v for both 4.25 and 1088, is 4.25. In order to preserve the difference in the scaling between these input data values, the 2 most significant bits of the exponent of the floating point representation of the input data values can be copied across to the storage format for the output data value.

The write out unit 31 then derives a first value v' from the input value v using the following equation:

$$v'=v\times 16$$

For example, where v is 4.25 (binary 100.01), v' is 68 (binary 1000100). This can be carried out in binary by shifting the radix or binary point 4 places to the right.

The first value v' is then used to determine a first range section end value. This is achieved by identifying the range section in the look-up table within which the first value v' lies. The look-up table may be implemented using a set of logical operations or a nested set of comparators.

In this embodiment, the lower end value for the identified range section is used as the first range section end value. For example, where v' is 68 (binary 1000100), the determined first range section is 66-86 and the indentified first range section end value is 66 (binary 1000010).

The second range section end value which corresponds to the first range section end value is then identified using the look-up table. The gradient which corresponds to the pair of first and second corresponding range sections is also identified using the look-up table. For example, where the first range section is 66-86, the indentified second range section end value is 153 (binary 10011001) and the indentified gradient is 32.

The first value v' is then converted to a second value u' using the following equation:

$$u'=\{[(v'-\text{first section end value})*128]/[\text{gradient}*16]\}+\text{second section end value}$$

For example, where v' is 68 (binary 1000100), the first section end value is 66 (binary 1000010), the second range section end value is 153 (binary 10011001) and the gradient is 32, u' is 153.5 (binary 10011001.1).

The write out unit 31 then derives an output value u from the second value u' using the following:

$$u=u'/128$$

For example, where u' is 153.5 (binary 10011001.1), u is 1.19921875 (binary 1.00110011). This can be carried out in binary by shifting the radix or binary point 7 places to the left.

The output value u is then written out to external memory 34 in a storage format as an output data value. As discussed above, the sign bit and scale bits are copied across from the floating point representation of the input data value, and only the fraction part of u is stored. Thus, when the input data value is 4.25, the storage format for the output data value is:

| Sign | Scale | | | | | | Fraction | | | | | | | |
|---|---|---|---|---|---|---|---|---|---|---|---|---|---|---|
| 0 | 1 | 0 | 0 | 0 | 1 | 1 | 0 | 0 | 1 | 1 | 0 | 0 | 0 | 0 |

Similarly, when the input data value is 1088, the storage format for the output data value is:

| Sign | Scale | | | | | | Fraction | | | | | | | |
|---|---|---|---|---|---|---|---|---|---|---|---|---|---|---|
| 0 | 1 | 1 | 0 | 0 | 1 | 1 | 0 | 0 | 1 | 1 | 0 | 0 | 0 | 0 |

As will be appreciated, the above process is repeated for each input data value to which the conversion is to be applied. Once the conversion has been applied to the input data values to produce output data values, the output data values are stored in external memory 34. The output data values may later be used, for example, by the fragment shader 26 of the graphics processing pipeline 3 as texture data.

Figure 3:
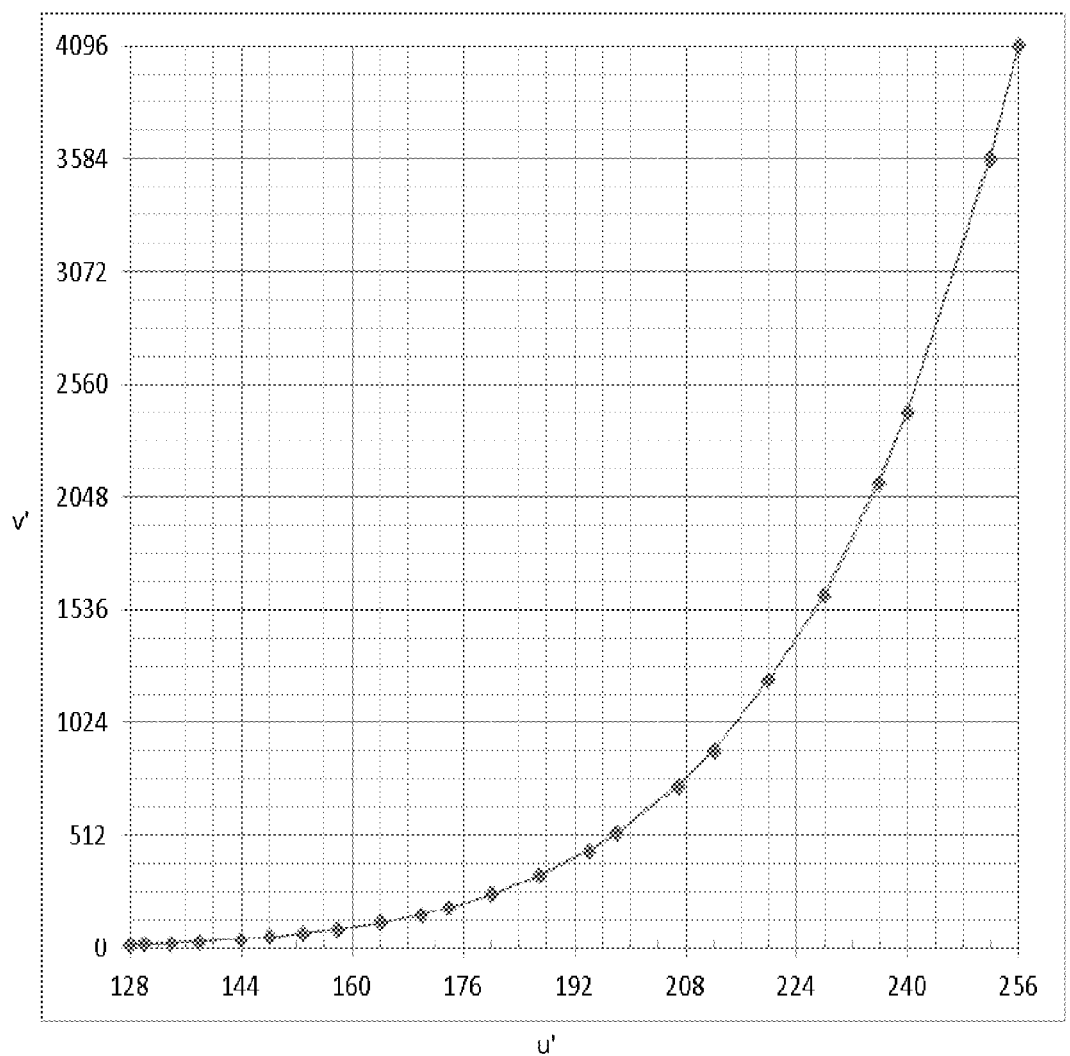
FIG. 3 shows a true function and an approximation of that function made in the manner of the technology described herein.

FIG. 3 shows how the true storage function compares to the approximated function over the whole range of input values v. As can be seen from FIG. 3, the approximated function closely follows the true storage function.

In another embodiment, the approximation of the storage function makes use of the look-up table shown in FIG. 4. This look-up table is derived from the look-up table in FIG. 2 in the following way.

Firstly, the first predetermined range of values v' and input values are represented in exponent n and mantissa m form. The input values v are then given by:

$$v=[1+m/64]2^n$$

As will be explained in more detail below, both the exponent n and mantissa m of v are used to look up values in the look-up table. However, the mantissa m of v' is used to calculate the second value from the first value, but the exponent n of v' is not. Instead, the gradients in the table are suitably scaled by the exponent n of v' such that the gradients can be used with the mantissa m of v' alone.

Thus, as will be appreciated, the gradient g' in FIG. 4 can be derived from the gradient g in FIG. 2 as follows:

$$g'=g/2^n$$

It should again be noted that the gradients are, advantageously, still integers and are still selected from the set $\{3, 4, 5\}2^n$. Furthermore, the use of exponent and mantissa form means that only 6 gradient values $\{5, 6, 8, 10, 12, 16\}$ are needed (with those gradients being re-used for different exponents), and so only 3 bits are needed to represent the gradients in this embodiment.

As will be appreciated, each floating point representation for the input data values can be directly mapped to an exponent n for v' by considering the 3 least significant bits of the exponent of the floating point representation, and to a mantissa m for v' by considering the 6 most significant bits of the exponent of the floating point representation.

In some embodiments, e.g. where the exponent of the floating point representation for the input data values is subjected to an offset, the 3 least significant bits of the exponent of the floating point representation for v may need an offset applied to them. In this embodiment, the offset which is applied to the exponent of the floating point representation is −15 and so the offset applied to the 3 least significant bits of the exponent for v is +1.

For example, the floating point representation for the input data value 4.25 is:

| Sign | Exponent | | | | | Mantissa | | | | | | | | |
|---|---|---|---|---|---|---|---|---|---|---|---|---|---|---|
| 0 | 1 | 0 | 0 | 0 | 1 | 0 | 0 | 0 | 1 | 0 | 0 | 0 | 0 | 0 |

The 3 least significant bits of the exponent (001 or decimal 1) give an exponent n of 2 (i.e. 1+1), and the 6 most significant bits of the mantissa (000100) give a mantissa m of 4.

Similarly, the floating point representation for the input data value 1088 is:

| Sign | Exponent | | | | | Mantissa | | | | | | | | |
|---|---|---|---|---|---|---|---|---|---|---|---|---|---|---|
| 0 | 1 | 1 | 0 | 0 | 1 | 0 | 0 | 0 | 1 | 0 | 0 | 0 | 0 | 0 |

Again, the 3 least significant bits of the exponent (001 or decimal 1) give an exponent n of 2 (i.e. 1+1), and the 6 most significant bits of the mantissa (000100) give a mantissa m of 4.

The second predetermined range is also offset such that the initial range section end value in the look-up table is zero. This means that only 7 bits are needed to store the section end values for the second predetermined range in the FIG. 4 look-up table (whereas 8 bits are needed in the FIG. 2 look-up table). As will be appreciated, each output value u is now mapped to the second predetermined range of values u' using the following equation:

$$u'=(u-1)\times 128$$

Furthermore, as will be appreciated, the first predetermined range is also (implicitly) scaled and offset such that only 12 bits (i.e. 3 bits for the exponent and 6 bits for the mantissa) are needed to store the section end values for the first predetermined range in the FIG. 4 look-up table (whereas 12 bits are needed in the FIG. 2 look-up table).

Use of the table in FIG. 4 to approximate the storage function will now be described.

An input data value in floating point format in the tile buffer 30 is read into the write out unit 31. The write out unit 31 then derives an exponent n and a mantissa m for a first value v' for the input data value in the manner discussed above. For example, for the input data value 4.25, the exponent n for v' is 2 and the mantissa m for v' is 4. (As will be appreciated, the write out unit 31 implicitly processes an intermediate input value v in the range 1 to 256 from the floating point representation by only considering the lowest 3 bits of the exponent of the floating point representation).

The exponent n and mantissa m for the first value v' are then used to determine a first (mantissa) range section end value. For example, where the exponent for v' is 2 and the mantissa for v' is 4 (binary 100), the determined first (mantissa) range section is 2-22 and the indentified first (mantissa) range section end value is 2 (binary 10).

The second range section end value which corresponds to the first (mantissa) range section end value is then identified using the look-up table. The gradient which corresponds to the pair of first and second corresponding range sections is also identified using the look-up table. For example, where the first (mantissa) range section is 2-22, the indentified second range section end value is 25 (binary 11001) and the indentified gradient is 8.

The first value v' is then converted to a second value u' using the following equation:

$$u'=\{[(v'-\text{first section end value})*128]/[\text{gradient}*64]\}+\text{second section end value}$$

For example, where the mantissa for v' is 4 (binary 100), the first (mantissa) section end value is 2 (binary 10), the second range section end value is 25 (binary 11001) and the gradient is 8, u' is 25.5 (binary 11001.1). As discussed above, an intermediate output value u can be derived from the second value u' using the following:

$$u=(u'/128)+1$$

For example, where u' is 25.5 (binary 11001.1), u is 1.19921875 (binary 1.00110011).

However, in this embodiment, the fraction part of u can be derived directly from u' by shifting the radix or binary point of u' 7 places to the left to give an output data value. The output data value can then written out to external memory 34 in a storage format directly from u'. As discussed above, the sign bit and scale bits are also copied across from the floating point representation of the input data value.

Thus, when the input data value is 4.25, the storage format for the output data value is:

| Sign | Scale | | | | | Fraction | | | | | | | | |
|---|---|---|---|---|---|---|---|---|---|---|---|---|---|---|
| 0 | 1 | 0 | 0 | 0 | 1 | 1 | 0 | 0 | 1 | 1 | 0 | 0 | 0 | 0 |

Similarly, when the input data value is 1088, the storage format for the output data value is:

| Sign | Scale | | | | | Fraction | | | | | | | | |
|---|---|---|---|---|---|---|---|---|---|---|---|---|---|---|
| 0 | 1 | 1 | 0 | 0 | 1 | 1 | 0 | 0 | 1 | 1 | 0 | 0 | 0 | 0 |

For some input values it is necessary to interpolate over a power of two boundary, i.e. within a range section where the exponent for v' increases by 1. This is dealt with in the following way.

The exponent n for the first value v' can be derived directly from the 3 least significant bits of the exponent of the data input value. For example, where the input data value is 4.0625, the 3 least significant bits of the exponent of the data input value are 001 (decimal 1), and this gives an exponent n for the first value v' of 1 (this is 1 less than the value which would normally be derived for the exponent n for the first value v' using the method discussed above).

The mantissa m for the first value v' can be derived by multiplying the 6 most significant bits of the mantissa of the input data value by 2 and then adding 64 (the maximum mantissa value) (an alternative approach would be to add 32 and then multiply by 2). For example, where the input data value is 4.0625, the 6 most significant bits of the mantissa are 000001 (decimal 1), and so the mantissa m for the first value v' is 66.

The values for the exponent n and mantissa m for the first value v' can then be used to look-up values in the manner discussed above. For example, where the exponent n for the first value v' is 1 and the mantissa m for the first value v' is 66, the first section end value is 38, the gradient is 12, and the second section end value is 20. The looked-up values can then be used to derive the second value u', and then the output data value, in the manner discussed above.

As will be appreciated, the above process is repeated for each input data value to which the conversion is to be applied. Once the conversion has been applied to the input data values to produce output data values, the output data values are stored in external memory 34. The output data values may later be used, for example, by the fragment shader 26 of the graphics processing pipeline 3 as texture data.

The above describes embodiments in which colour values are stored. Embodiments of the technology described herein in which colour values are retrieved from storage will now be described.

In one embodiment, when input data values which are stored in the main memory 34 are read into the texture buffer 36 by the read in unit 38, an approximation of a retrieval function R(u) is used to give output data values for temporary storage in the texture buffer 36. The retrieval function which is approximated in this embodiment is:

$$R(u)=u^8$$

As will be appreciated, R(u) is the inverse of S(v) discussed above. Thus, the tables shown in FIGS. 2 and 4 can also be used to approximate the retrieval function.

Use of the table in FIG. 2 to approximate the retrieval function will now be described.

A input data value in the main memory 34 is read into the read in unit 38. The input data value has the storage format:

| Sign | Scale | | | | | Fraction | | | | | | | | | |
|------|-------|---|---|---|---|----------|---|---|---|---|---|---|---|---|---|
| 15 | 14 | 13 | 12 | 11 | 10 | 9 | 8 | 7 | 6 | 5 | 4 | 3 | 2 | 1 | 0 |

The read in unit 38 derives the input value u from the storage format by assuming that the fraction has a leading 1. For example, the input value 1.19921875 would be derived from the following storage format:

| Sign | Scale | | | | | Fraction | | | | | | | | | |
|------|-------|---|---|---|---|----------|---|---|---|---|---|---|---|---|---|
| 0 | 1 | 0 | 0 | 0 | 1 | 1 | 0 | 0 | 1 | 1 | 0 | 0 | 0 | 0 | 0 |

The read in unit 38 then derives a first value u' from the input value u using the following:

$$u'=u\times 128$$

For example, where u is 1.19921875 (binary 1.00110011), u' is 153.5 (binary 10011001.1). This can be carried out in binary by shifting the radix or binary point 7 places to the right.

The first value u' is then used to determine a first range section end value. This is achieved by identifying the range section in the look-up table within which the first value u' lies. For example, where u' is 153.5, the determined first range section is 153-158 and the indentified first range section end value is 153 (binary 10011001).

The second range section end value which corresponds to the first range section end value is then identified using the look-up table. The gradient which corresponds to the pair of first and second corresponding range sections is also identified using the look-up table. For example, where the first range section is 153-158, the indentified second range section end value is 66 (binary 1000010) and the indentified gradient is 32.

The first value u' is then converted to a second value v' using the following:

$$v'=\{[(u'-\text{first section end value})*\text{gradient}*16]/128\}+\text{second section end value}$$

For example, where u' is 153.5 (binary 10011001.1), the first section end value is 153 (binary 10011001), the second range section end value is 66 (binary 1000010) and the gradient is 32, v' is 68 (binary 1000100).

The read in unit 38 derives an output value v from the second value v' using the following:

$$v=v'/16$$

For example, where v' is 68 (binary 1000100), v is 4.25 (binary 100.01). This can be carried out in binary by shifting the radix or binary point 4 places to the left.

The output value v is then written to the texture buffer 36 in as an output data value floating point format. The read in unit 38 also copies across the sign bit of the input data value to the sign bit of the floating point format of the output data value, and copies across the scale bits of the input data value to the two most significant bits of the floating point format of the output data value.

In the above example, where v is 4.25 (binary 100.01), the sign bit of the input data value is 0 and the scale bits of the of the input data value are 10, the floating point representation for the output data value in binary16 is:

| Sign | Exponent | | | | | Mantissa | | | | | | | | | |
|------|----------|---|---|---|---|----------|---|---|---|---|---|---|---|---|---|
| 0 | 1 | 0 | 0 | 0 | 1 | 0 | 0 | 0 | 1 | 0 | 0 | 0 | 0 | 0 | 0 |

As will be appreciated, the above process is repeated for each input data value to which the conversion is to be applied. Once the conversion has been applied to the input data values to produce output data values, the output data values are stored in the texture buffer 36. The output data values may then be used, for example, by the fragment shader 26 of the graphics processing pipeline 3 as texture data.

In another embodiment, the approximation of the retrieval function makes use of the look-up table shown in FIG. 4. Use of the table in FIG. 4 to approximate the storage function will now be described.

An input data value in the main memory 34 is read into the read in unit 38. As discussed above, the input data value has the format:

| Sign | Scale | | | | | Fraction | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |

An intermediate input value u can be derived from the storage format by assuming that the fraction has a leading 1. For example, the intermediate input value 1.19921875 would be derived from the following storage format:

| Sign | Scale | | | | | Fraction | | | | | | | | | |
|---|---|---|---|---|---|---|---|---|---|---|---|---|---|---|---|
| 0 | 1 | 0 | 0 | 0 | 1 | 1 | 0 | 0 | 1 | 1 | 0 | 0 | 0 | 0 | 0 |

A first value u' can be derived from the intermediate input value u using the following:

$$u'=(u-1)\times 128$$

For example, where u is 1.19921875 (binary 1.00110011), u' is, u' is 25.5 (binary 11001.1). This can be carried out in binary by ignoring the leading 1 and shifting the radix or binary point 7 places to the right.

However, the first value u' can be derived directly from the fraction part of the input data value by taking the 6 most significant bits of the fraction part of the input data value to be the integer part of the first value u' and the remaining bits of the fraction part of the input data value to be the fraction part of the first value u'.

The first value u' is then used to determine a first range section end value. This is achieved by identifying the range section in the look-up table within which the first value u' lies. For example, where u' is 25.5 (binary 11001.1), the determined first range section is 25-30 and the indentified first range section end value is 25 (binary 11001).

The exponent and mantissa for the second range section end value which corresponds to the first range section end value are then identified using the look-up table. The gradient which corresponds to the pair of first and second corresponding range sections is also identified using the look-up table. For example, where the first range section is 25.5 (binary 11001.1), the indentified exponent for the second range section end value is 2, the mantissa for the second range section end value is 2 (binary 10), and the indentified gradient is 8.

The first value u' is then converted to a second value v' using the following:

$$v'=\{[(u'-\text{first section end value})*\text{gradient}*64]/128\}+\text{second section end value}$$

For example, where u' is 25.5 (binary 11001.1), the first section end value is 25 (binary 11001), the second (mantissa) range section end value is 2 (binary 10) and the gradient is 8, v' is 4 (binary 100).

An intermediate output value v can be derived from the second value v' using the following:

$$v=[1+m/64]2^n$$

For example, where the mantissa m is 4 (binary 100) and the exponent n is 2, v is 4.25 (binary 100.01). However, performing this calculation is not necessary in order to write an output data value to the texture buffer 36 in floating point format.

Instead, the read in unit 38 can produce the 3 least significant bits of the exponent of the floating point representation of the output data value from the exponent n by subtracting 1 from the exponent n. For example, where the exponent is 2 (binary 10), the 3 least significant bits of the exponent for the floating point representation would be 001 (i.e. decimal 1).

The read in unit can also produce a mantissa for the floating point representation of the output data value from the value v' by deriving a 6 bit binary representation for the integer part of v', and then using those 6 bits as the most significant 6 bits of the mantissa for the floating point representation of the output data value. In the above example, where v' is 4, the 6-bit representation would be 000100, and so the most significant 6 bits of the mantissa for the floating point representation of the output data value would be 000100.

The most significant fraction bits for v' can also be included so as to fill the remaining part of the mantissa for the floating point representation of the output data value. In this embodiment, this would involve using the 4 most significant bits of the fraction part of v' as the 4 least significant bits of the mantissa for the floating point representation of the output data value. In the above example, where v' is 4, the 4 most significant bits of the fraction part of v' are 0000 (i.e. there is no fractional part to v'), and so the least significant 4 bits of the mantissa for the floating point representation of the output data value would be 0000.

The read in unit also copies across the sign bit of the stored value to the sign bit of the floating point format, and copies across the scale bits of the stored value to the two most significant bits of the floating point format.

Thus, in the above example where the mantissa of v' is 4 (giving a floating point mantissa of 0001000000), the scale bits of the input data value are 10 and the exponent of v' is 2 (giving a floating point exponent of 10001), and the sign bit of the input data value is 0, the floating point format of the output data value in binary16 is:

| Sign | Exponent | | | | | Mantissa | | | | | | | | | |
|---|---|---|---|---|---|---|---|---|---|---|---|---|---|---|---|
| 0 | 1 | 0 | 0 | 0 | 1 | 0 | 0 | 0 | 1 | 0 | 0 | 0 | 0 | 0 | 0 |

As discussed above, for some input values it is necessary to interpolate over a power of two boundary, i.e. within a range section where the exponent for v' increases by 1. This is dealt with in the following way.

The first value u' is used to look-up an exponent and a mantissa for the second section end value, together with a gradient, in the manner discussed above. For example, where the first value u' is 24.66, the exponent is 1, the mantissa for the second section end value is 38, and the gradient is 12. These looked-up values are then used to derive a mantissa m for the second value v' in the manner discussed above. In the present example, the mantissa m for the second value v' is 66.

The 6 most significant bits of the mantissa of the output data value are then derived from the mantissa m for the second value v' by subtracting 64 (i.e. the maximum mantissa value) and then dividing by 2 (an alternative approach would be to divide by 2 and then subtract 32). In this example, the mantissa m for the second value v' is 66 and so the 6 most significant bits of the mantissa of the output data value are 000001 (decimal 1).

The 3 least significant bits of the exponent of the data output value can be derived directly from the looked-up exponent n. For example, where the looked-up exponent is decimal 1, the 3 least significant bits of the exponent of the data output value are 001 (this is 1 more than the value which would normally be derived from the exponent n using the method discussed above).

As will be appreciated, the above process is repeated for each input data value to which the conversion is to be applied. Once the conversion has been applied to the input data values to produce output data values, the output data values are stored in the texture buffer 36. The output values may then be used, for example, by the fragment shader 26 of the graphics processing pipeline 3 as texture data.

As will be appreciated from the above, the technology described herein in its embodiments at least can provide a system that can approximate a function in an extremely efficient manner.

This is achieved in the embodiments of the technology described herein at least by using first and second predetermined ranges of values which are quantised into plural corresponding pairs of range sections, a predetermined gradient for each pair of range sections, and predetermined section end values for each pair of range sections.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A processor-implemented method of converting an input graphics data value to an output graphics data value by approximating a function that maps input values to output values, the processor comprising processing circuitry including a bit shift circuit, a dedicated divide by 3 circuit, and a dedicated divide by 5 circuit, the method comprising:

deriving a first value from the input graphics data value, wherein the first value is within a predetermined first range of values, the first range of values being quantised into a first set of plural range sections, wherein each range section of the first set of plural range sections comprises a first predetermined section end value; and converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the gradients for the pairs of corresponding first and second range sections are gradient values selected from the set consisting of: $3*2^n$; $4*2^n$; and $5*2^n$; where n is a non-negative integer, wherein the step of converting the first value into the second value comprises:

determining by reference to a look-up table that is stored in memory or that is accessed using a set of logical operations or nested set of comparators a first predetermined section end value for a first range section of the first set of plural range sections within which the first value lies, identifying by reference to the look-up table a second predetermined section end value for a second range section of the second set of plural range sections that corresponds to the first range section, identifying by reference to the look-up table the gradient associated with the pair of corresponding first and second range sections, and converting the first value into the second value using the first section end value, the second section end value and the gradient, wherein using the gradient comprises using the bit shift circuit when dividing by 2, the dedicated divide by 3 circuit when dividing by 3, and the dedicated divide by 5 circuit when dividing by 5;

the method further comprising:

deriving the output graphics data value from the second value; and providing a graphics output for display based on the output graphics data value.

2. The processor-implemented method of claim 1, comprising:

reading the input graphics data value from a buffer of a graphics processing system, and storing the output graphics data value in external memory; or reading the input graphics data value from external memory, and storing the output graphics data value in a buffer of a graphics processing system.

3. The processor-implemented method of claim 1, wherein:

the input graphics data value is stored in a floating point format having a sign bit, a plurality of exponent bits, and a plurality of mantissa bits, and deriving the first value from the input graphics data value comprises reading some but not all of the bits of the mantissa of the input graphics data value and some but not all of the bits of the exponent of the input graphics data value; or the input graphics data value is stored in a format having a sign bit, one or more scale bits, and a plurality of fraction bits, and deriving the first value from the input graphics data value comprises reading the fraction bits of the input graphics data value.

4. The processor-implemented method of claim 1, wherein:
the output graphics data value is stored in a format having a sign bit, one or more scale bits, and a plurality of fraction bits, and deriving the output graphics data value from the second value comprises deriving the fraction bits of the output graphics data value from the second value; or
the output graphics data value is stored in a floating point format having a sign bit, a plurality of exponent bits, and a plurality of mantissa bits, and deriving the output graphics data value from the second value comprises deriving some but not all of the exponent bits of the output graphics data value from the second value and deriving the mantissa bits of the output graphics data value from the second value.

5. The processor-implemented method of claim 1, wherein:
the input graphics data value is stored in a floating point format having a sign bit, a plurality of exponent bits, and a plurality of mantissa bits, the output graphics data value is stored in a format having a sign bit, one or more scale bits, and a plurality of fraction bits, and the method comprises copying the sign bit of the input graphics data value to the sign bit of the output graphics data value, and copying some but not all of the bits of the exponent of the input graphics data value to the scale bit or bits of the output graphics data value; or
the input graphics data value is stored in a format having a sign bit, one or more scale bits, and a plurality of fraction bits, the output graphics data value is stored in a floating point format having a sign bit, a plurality of exponent bits, and a plurality of mantissa bits, and the method comprises copying the sign bit of the input graphics data value to the sign bit of the output graphics data value, and copying the scale bit or bits of the input graphics data value to some but not all of the bits of the exponent of the output graphics data value.

6. The processor-implemented method of claim 1, wherein:
at least one selected from the group consisting of: the first predetermined section end values of the first set of plural range sections; the second predetermined section end values of the second set of plural range sections; and the gradients for the pairs of corresponding first and second range sections; are represented by integer values.

7. The processor-implemented method of claim 1, wherein converting the first value into the second value comprises interpolating using the first section end value, the second section end value and the gradient.

8. A graphics processing system comprising:
a data processor comprising processing circuitry including a bit shift circuit, a dedicated divide by 3 circuit, and a dedicated divide by 5 circuit, the processing circuitry being configured to convert an input graphics data value to an output graphics data value by approximating a function that maps input values to output values, the processing circuitry being configured to:
derive a first value from an input graphics data value to be converted to an output graphics data value, wherein the first value is within a predetermined first range of values, the first range of values being quantised into a first set of plural range sections, wherein each range section of the first set of plural range sections comprises a first predetermined section end value; and
convert the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the gradients for the pairs of corresponding first and second range sections are gradient values selected from the set consisting of: $3*2^n$; $4*2^n$; and $5*2^n$; where n is a non-negative integer, wherein to convert the first value into the second value the processing circuitry:
determines by reference to a look-up table that is stored in memory or that is accessed using a set of logical operations or nested set of comparators a first predetermined section end value for a first range section of the first set of plural range sections within which the first value lies,
identifies by reference to the look-up table a second predetermined section end value for a second range section of the second set of plural range sections that corresponds to the first range section,
identifies by reference to the look-up table the gradient associated with the pair of corresponding first and second range sections, and
converts the first value into the second value using the first section end value, the second section end value and the gradient, wherein using the gradient comprises the processing circuitry using the bit shift circuit when dividing by 2, the dedicated divide by 3 circuit when dividing by 3, and the dedicated divide by 5 circuit when dividing by 5;
the processing circuitry being further configured to:
derive the output graphics data value from the second value; and
provide a graphics output for display based on the output graphics data value.

9. The graphics processing system of claim 8, wherein the data processor is configured to:
read the input graphics data value from a buffer of the graphics processing system, and store the output graphics data value in external memory; or
read the input graphics data value from external memory, and store the output graphics data value in a buffer of the graphics processing system.

10. The graphics processing system of claim 8, wherein:
the input graphics data value is stored in a floating point format having a sign bit, a plurality of exponent bits, and a plurality of mantissa bits, and to derive the first value from the input graphics data value the processing circuitry reads some but not all of the bits of the mantissa of the input graphics data value and some but not all of the bits of the exponent of the input graphics data value; or
the input graphics data value is stored in a format having a sign bit, one or more scale bits, and a plurality of fraction bits, and to derive the first value from the input graphics data value the processing circuitry reads the fraction bits of the input graphics data value.

11. The graphics processing system of claim 8, wherein:
the output graphics data value is stored in a format having a sign bit, one or more scale bits, and a plurality of fraction bits, and to derive the output graphics data value from the second value the processing circuitry derives the fraction bits of the output graphics data value from the second value; or the output graphics data value is stored in a floating point format having a sign bit, a plurality of exponent bits, and a plurality of mantissa bits, and to derive the output graphics data value from the second value the processing circuitry derives some but not all of the exponent bits of the output graphics data value from the second value and derives the mantissa bits of the output graphics data value from the second value.

12. The graphics processing system of claim 8, wherein:
the input graphics data value is stored in a floating point format having a sign bit, a plurality of exponent bits, and a plurality of mantissa bits, the output graphics data value is stored in a format having a sign bit, one or more scale bits, and a plurality of fraction bits, and the processing circuitry is configured to copy the sign bit of the input graphics data value to the sign bit of the output graphics data value, and copy some but not all of the bits of the exponent of the input graphics data value to the scale bit or bits of the output graphics data value; or the input graphics data value is stored in a format having a sign bit, one or more scale bits, and a plurality of fraction bits, the output graphics data value is stored in a floating point format having a sign bit, a plurality of exponent bits, and a plurality of mantissa bits, and the processing circuitry is configured to copy the sign bit of the input graphics data value to the sign bit of the output graphics data value, and copy the scale bit or bits of the input graphics data value to some but not all of the bits of the exponent of the output graphics data value.

13. The graphics processing system of claim 8, wherein:
at least one selected from the group consisting of: the first predetermined section end values of the first set of plural range sections; the second predetermined section end values of the second set of plural range sections; and the gradients for the pairs of corresponding first and second range sections; are represented by integer values.

14. The graphics processing system of claim 8, wherein to convert the first value into the second value the processing circuitry interpolates using the first section end value, the second section end value and the gradient.

15. A computer readable non-transitory storage medium storing computer software code which when executing on a processor performs a method of converting an input graphics data value to an output graphics data value by approximating a function that maps input values to output values, the processor comprising processing circuitry including a bit shift circuit, a dedicated divide by 3 circuit, and a dedicated divide by 5 circuit, the method comprising:

deriving a first value from the input graphics data value, wherein the first value is within a predetermined first range of values, the first range of values being quantised into a first set of plural range sections, wherein each range section of the first set of plural range sections comprises a first predetermined section end value; and converting the first value into a second value that is within a predetermined second range of values, the second range of values being quantised into a second set of plural range sections, wherein each range section of the second set of plural range sections comprises a second predetermined section end value, wherein each range section of the second set of plural range sections corresponds to a range section of the first set of plural range sections such that there are respective pairs of corresponding first and second range sections, wherein each pair of corresponding first and second range sections is associated with a gradient, the gradient for each pair of corresponding first and second range sections approximating the gradient of the function for that pair of corresponding first and second range sections, wherein the gradients for the pairs of corresponding first and second range sections are gradient values selected from the set consisting of: $3*2^n$; $4*2^n$; and $5*2^n$; where n is a non-negative integer, wherein the step of converting the first value into the second value comprises:

determining by reference to a look-up table that is stored in memory or that is accessed using a set of logical operations or nested set of comparators a first predetermined section end value for a first range section of the first set of plural range sections within which the first value lies, identifying by reference to the look-up table a second predetermined section end value for a second range section of the second set of plural range sections that corresponds to the first range section, identifying by reference to the look-up table the gradient associated with the pair of corresponding first and second range sections, and converting the first value into the second value using the first section end value, the second section end value and the gradient, wherein using the gradient comprises using the bit shift circuit when dividing by 2, the dedicated divide by 3 circuit when dividing by 3, and the dedicated divide by 5 circuit when dividing by 5;

the method further comprising:

deriving the output graphics data value from the second value; and providing a graphics output for display based on the output graphics data value.

* * * * *